United States Patent [19]

Kakimoto

[11] Patent Number: 5,439,337
[45] Date of Patent: Aug. 8, 1995

[54] LOCK NUT

[76] Inventor: Hiroshi Kakimoto, 31-8, Akitsu-cho 4-chome, Higashimurayama-shi, Tokyo 189, Japan

[21] Appl. No.: 226,464

[22] Filed: Apr. 12, 1994

[30] Foreign Application Priority Data

Apr. 12, 1993 [JP] Japan .................... 5-110070

[51] Int. Cl.6 .................... F16B 39/04; F16B 39/12
[52] U.S. Cl. .................... 411/240; 411/226; 411/931
[58] Field of Search ............ 411/149, 224, 239, 240, 411/226, 222, 931

[56] References Cited

U.S. PATENT DOCUMENTS

| 910,712 | 1/1909 | McCoy | 411/149 X |
| 1,005,678 | 10/1911 | Wolfe | 411/224 |
| 1,047,064 | 12/1912 | Ivers | 411/240 X |
| 1,967,237 | 7/1934 | Freeland | 411/240 X |
| 3,664,226 | 5/1972 | Gonzalez | 411/931 X |
| 3,867,972 | 2/1975 | Gonzalez | 411/240 |

FOREIGN PATENT DOCUMENTS

| 161923 | 3/1955 | Australia | 411/239 |
| 221433 | 9/1924 | United Kingdom | 411/226 |

Primary Examiner—Neill R. Wilson
Attorney, Agent, or Firm—Sughrue, Mion, Zinn, Macpeak & Seas

[57] ABSTRACT

In order to provide a lock nut having a high reliability free from loosening, three nuts are used. The nut closest to the bolt head and the intermediate nut are engaged with each other in only the peripheral direction and do not come into surface-contact with each other in the axial direction, thereby aligning the outer peripheries thereof and forming internal threads on a variety of center bores. Then, the intermediate nut and the outermost nut are brought into press-contact with each other in the axial direction.

11 Claims, 8 Drawing Sheets

LOCK NUT

BACKGROUND OF THE INVENTION

1. Field of the Invention

The present invention relates to a structure of a lock nut and components thereof, consisting of three nuts combined to be screwed onto a bolt for anti-loosening. Of the three nuts the outermost nut is the same as the ordinary nut widely available in the market.

2. Description of the Related Arts

As measures of stopping loosening by a plurality of nuts, use has been hitherto made of a double nut including a couple of nuts having the same shape. After firmly screwing one nut onto a material to be fastened, the other nut is fastened to the one nut.

The double nut proposed in Japanese Patent Publication No. 60-249718 was an improvement of the conventional double nut.

Figure 8:
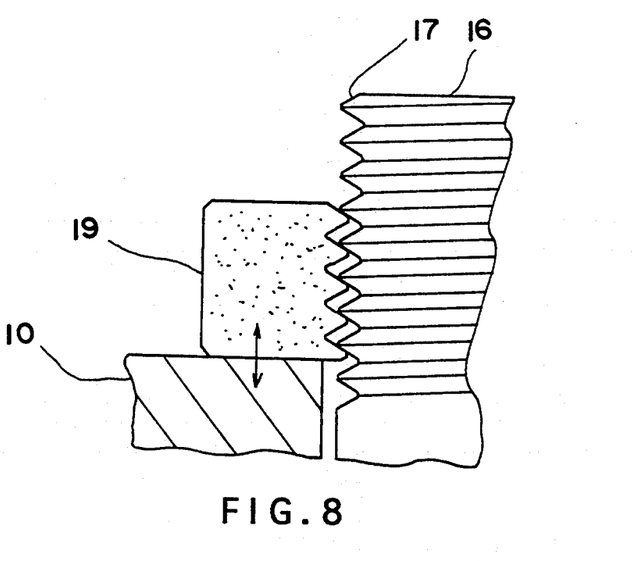
FIG. 8 is an explanatory diagram showing the state fastening a plate material to be fastened 10 by a single nut 19.

Such conventional double nut was subjected to a frequent loosening compared to a single nut. As shown in FIG. 8, this arises from the fact the female thread surface of the upper (outer) nut 18 and the surface of the male thread 17 of the bolt 16 are only substantially brought into contact with each other, whereas the female thread surface of the lower nut 19 and the surface of the male thread of the bolt do not substantially come into contact with each other.

Figure 10:
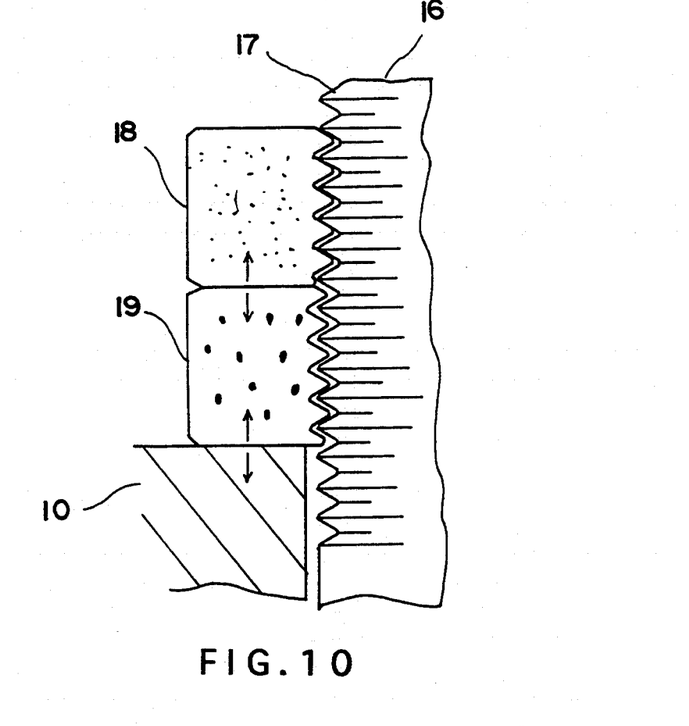
FIG. 10 is an explanatory diagram showing the contact state between the male thread of the nut 19 and the male thread 17 of the bolt under the condition where a plate material to be fastened 10 is brought into press-contact with the lower surface side of the nut 19 while the nut 18 is brought into press-contact with the upper surface side of the nut 19.

The following is the detailed description of this conventional double nut. As shown in FIG. 10, a nut 18 is fastened to the top surface of another nut 19. By fastening the nut 19 onto the male thread 17, shown in FIG. 8, the shank of the male thread 17 is upwardly pulled to bring only the upper surface side of the male thread of the nut 19 into press-contact with the lower surface of the male thread 17. When the outer nut 18 is fastened to the inner nut 19 under such conditions as shown in FIG. 10, the shank of the bolt 16 is upwardly pulled by the outer nut 18. This causes the contact surfaces of the male thread of the inner nut 19 and male thread 17 of the bolt 16 to separate from each other.

As a result, the male thread 17 and the female thread of the inner nut 19 are not allowed to be in contact with each other, thereby making it impossible to utilize the frictional resistance between the two nuts to prevent loosening. Therefore, the inner nut 19 easily rotates to cancel the anti-loosening effect.

Figure 9:
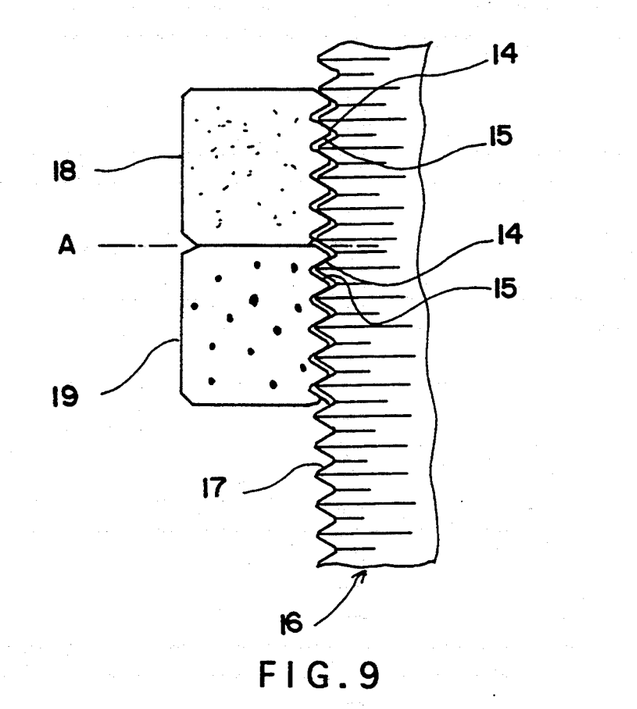
FIG. 9 is an explanatory diagram showing the state where a pair of nuts 18, 19 are at their contact surfaces fastened to the intermediate portion of the male thread 17 of the bolt 16.

It will be understood that in the double nut structure shown in FIG. 9 two nuts are fastened to the male thread 17 of the bolt 16 without the member to be fastened coming into contact with the inner nut 19, and hence this double nut structure has an extremely strong locking effect. The reason is that since the bolt 16 is pulled by the outer nut 18 and the inner nut 19 in the opposite direction and the two nuts are displaceable in the repellent directions, the outer nut 18 and the inner nut are brought into contact with the male thread 17.

On the contrary, when a pressing force is applied on the upper and lower surfaces of the inner nut 19, the inner nut 19 is not permitted to be displaced in any directions, and hence the male tread of the inner nut 19 and the male thread 17 of the bolt 16 are not substantially brought into contact with each other. It will be obvious that as a result of this, the anti-loosening effect is impaired. The same applies to the double nut proposed in Japanese Patent Publication 60-249718.

SUMMARY OF THE INVENTION

Therefore, the present invention employs three nuts. The lowermost nut fastens a plate material to be fastened 10, and the upper two nuts exhibit a strong double-nut effect shown in FIG. 9. Further provided are locking portions intended to be engaged in the loosening-stop direction between the lowermost nut the double nut, thereby executing an accurate anti-loosening of the lowermost nut.

According to one aspect of the present invention, the lock nut comprises a pair of a first nut and a second nut each having at its outer periphery in the radial direction polygonal planes and each having the same helical groove on the inner surface of a hole provided therein. The pair of nuts are superposed in the axial direction. One end surface in the axial direction of the first and second nuts is planar. The first and second nuts include locking means provided on the other end surfaces in the axial direction thereof and intended to be integrally and rotationally screwed on the outer periphery of the shank of a bolt by engaging with each other.

The pair of first and second nuts when engaged satisfies the following conditions.

(1) the polygonal planes of the first nut and the second nut are aligned in the axial direction;

(2) the leading end of the helical groove of the second nut is located on an elongated line of the helical groove at the trailing end of the helical groove of the first nut; and (3) the locking means are to be so formed that a pressing force in the axial direction is not transmitted to between the end surfaces in the axial direction of the first and second nuts.

Figure 1:
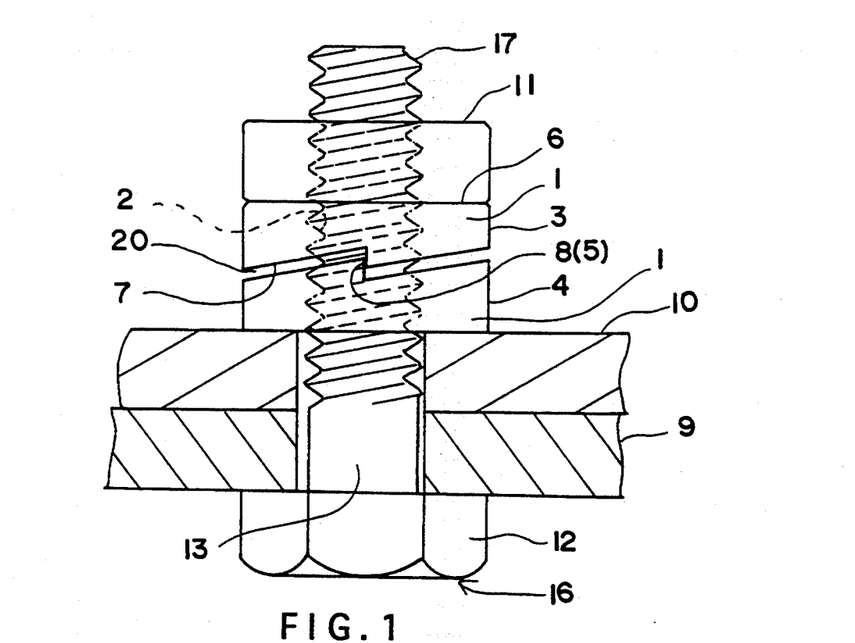
FIG. 1 is a partially sectional view showing the state where a lock nut of the present invention is being used.
Figure 2:
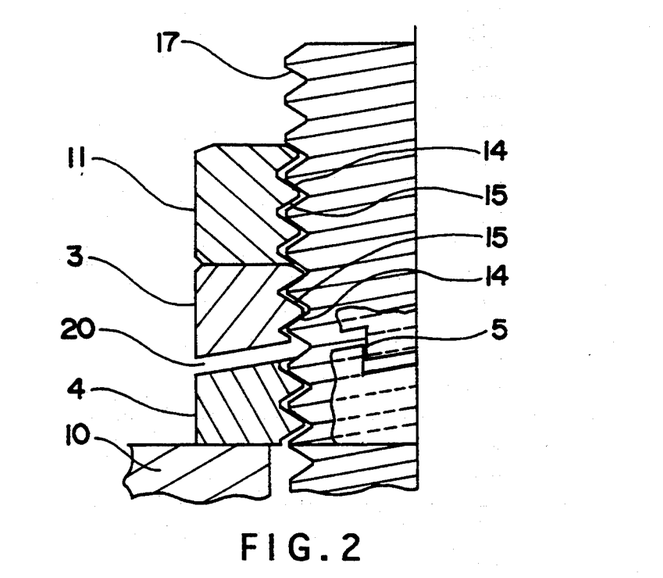
FIG. 2 is an enlarged sectional view of the main part of the lock nut of the present invention.

When three lock nuts of the present invention are screwed onto a bolt 16 which has been inserted into bolt holes of a fastening plate material 9 and a plate material to be fastened 10, as shown in FIGS. 1 and 2, a gap 20 is created between a first nut 3 and a second nut 4, to substantially eliminate a contact-pressure in the axial direction between the two nuts. A firm surface-contact is effected between the second nut 4 and the plate material to be fastened 10, while a firm surface-contact in the axial direction is effected between the first nut 4 and the pressure nut 11, thus achieving a strong locking effect by virtue of an ideal double nut consisting of the first nut 3 and the pressure nut 11. For this reason, the first nut 3 is not allowed to loosen. In addition, the rotation of the first nut 3 and the second nut 4 are fixedly stopped by locking portions 5, to thereby prevent the second nut 4 from rotating in the loosening direction. As a result, there can be obtained a lock nut having a larger anti-loosening effect as a whole.

The above and other objects, features and advantages will become more apparent by reading the following detailed description in conjunction with the accompanying drawings showing, by way of illustrative examples, the preferred embodiments of the present invention.

DESCRIPTION OF THE PREFERRED EMBODIMENTS

An embodiment of a lock nut constructed in accordance with the present invention will now be described with reference to the accompanying drawings.

Figure 3:
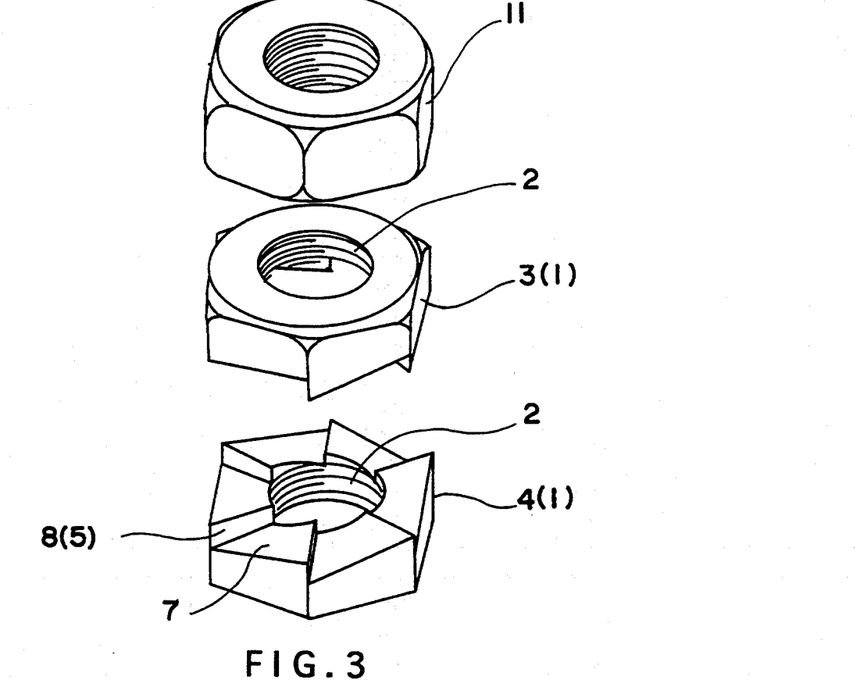
FIG. 3 is a perspective view of the lock nut of the present invention.
Figure 4:
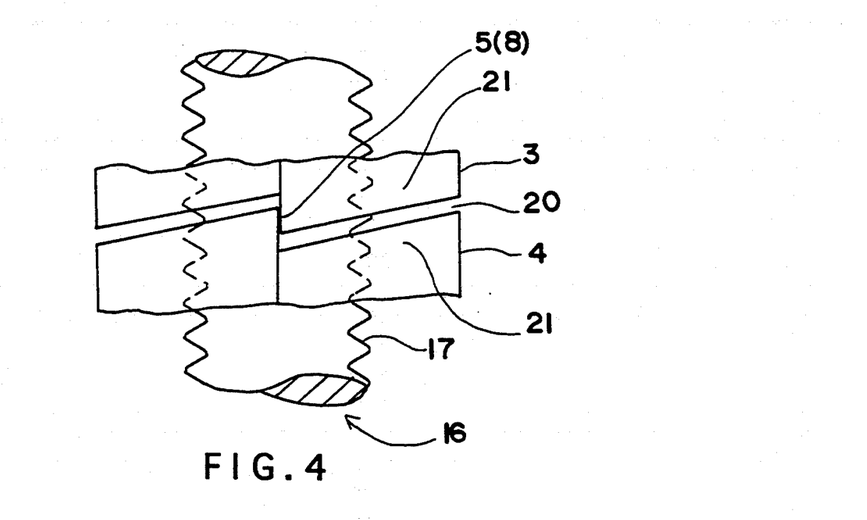
FIG. 4 is an explanatory diagram showing the locking state of the lock nut.
Figure 5:
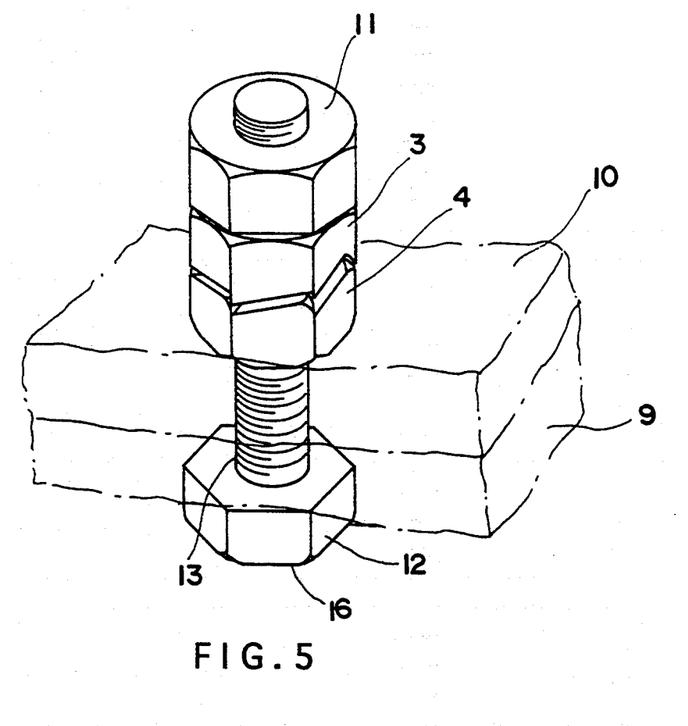
FIG. 5 is a perspective view showing the state where the lock nut is in use.

FIG. 1 is a partially cut-away view showing a fastening state of the present lock nut, FIG. 2 is an enlarged sectional view of its main part, FIG. 3 is a perspective view of the present lock nut, FIG. 4 is an explanatory diagram showing the state where the first nut 3 is engaged with the second nut 4, and FIG. 5 is a perspective view showing the state where the present lock is being used.

As shown in FIG. 3, a lock nut of the present invention comprises a first nut 3 and a second nut 4 which are of the same shape, each having on its only one end surface a locking portion 5 serving as a locking means whose axial sectional view is in the form of a serration. The lock nut further comprises an ordinary pressure nut 11 having flat upper and lower end surfaces. Each nut includes along its outer periphery six-sided polygonal planes 1 and includes an axially extending center bore provided with a helical groove 2. The helical groove 2 is substantially the same as a female thread formed on the ordinary nut and has the same pitch and lead angle as that.

The serrated locking portions 5 formed on one end surface of the first nut 3 and the second nut 4 each include an inclined surface 7 and a rise-up surface 8 so as to form a wave-like triangle in such a manner that the wave advances in the circumferential direction around the axis. The rise-up surface 8 extends in a direction substantially perpendicular to the axial direction. The inclined surface 7 is downwardly inclined with respect to the advancing direction of the spiral of the helical groove 2. The inclination of the inclined surface 7 must be larger than the lead angle of the female thread. More specifically, it is one to six times the lead angle.

Description will be given of an interrelation between the the helical grooves 2 of the first nut 3 and the second nut 4. When the polygonal planes 1 of the two nuts comes into matching with each other, the locking portions 5 of the two nuts are brought into contact with each other with a gap 20 defined between the confronting surfaces of the two nuts. Under this state, the leading end of the helical groove 2 of the second nut 4 is located on the spirally elongated line of the trailing end of the spiral groove 2 of the first nut 3.

A male thread 17 of the bolt 16 is intended to be serially screwed into the pair of first nut 3 and second nut 4. In other words, as shown in FIG. 1 or 2 established is the interrelation among the matching of the polygonal planes, the engagement of the locking portions 5 and the elongation of the helical groove 2.

A method of cutting the helical grooves 2 of the first nut 3 and the second nut 4 having such interrelation comprises the steps of, by way of example, forming a serrated surface on each of one end surfaces in the axial direction of the first nut 3 and the second nut 4; interposing a spacer having a thickness corresponding to the gap 20 so as to be superposed in the axial direction to bring the rise-up surfaces 8 into contact with each other; and rotating a tap for screw thread cutting to advance into the center bores of the first nut 3 and the second nut 4 with the outer peripheries integrally fixed. Since the gap serves to prevent a surface pressure from being applied to between the first nut 3 and the second nut 4, it can be extremely small of the order of 0.1 to 1.0 mm.

Another example of manufacturing method comprises the steps of forming a serrated locking portion 5 on each end surface before individually and independently forming a helical groove 2 on a center bore; finding a matching position of the polygonal planes in which a gap 20 is formed under the state where the matching has been achieved as shown in FIG. 4; and conferring matching marks 21 on the matching surfaces.

For use, the matching marks 21 are aligned, the locking portions of the first nut 3 and the second nut 4 are locked with each other, and the two nuts are fitted onto the male thread 17. In other words, the lock nut of the present invention is to be used as follows.

As shown in FIG. 1, the bolt hole of the fastening plate material 9 is aligned with the bolt hole of the plate material to be fastened 10, and the shank 13 of the bolt 16 is inserted into the bolt insertion hole. Then, the pair of first nut 3 and the second nut 4 are integrally screwed onto the male thread 17 of the bolt 16. For this screwing, the confronting end surfaces of the pair of first nut 3 and the second nut 4 may be initially in contact.

When the two nuts 3 and 4 are screwed onto the bolt and are locked by the rise-up surfaces 8, there appears constantly a gap 20 between the two nuts. This arises from the fact that the interrelation between the helical grooves and the locking portions are preset so as to form a gap 20 between the end surfaces in the axial direction of the two nuts whenever the locking portions 5 of the two nuts 3 and 4 are brought into abutment upon screwing the first nut 3 onto the upper portion of the second nut 4. More specifically, the leading end of the helical groove of the second nut 4 is located on the elongated line of the trailing end of the helical groove of the first nut 3 under this locking state, with the result that the trailing end is discontinuous to the leading end. In addition, the polygonal planes of the outer peripheries of the two nuts 3, 4 are aligned with each other under such locking state. Thus, a pressure nut 11 can be fastened to the external side of the first nut 3 after completely screwing the second nut 4 on the plate material to be fastened 10 and then locking the first nut 3 thereto. It is to be appreciated that when the first nut 3 is screwed thereon the first nut 3 and the second nut 4 are locked by the rise-up surface 8 of the locking portion 5. By way of example, the outer periphery of a spanner is fitted simultaneously into the pair of first nut 3 and the second nut 4 so that the two nuts can be integrally fastened.

Figure 11:
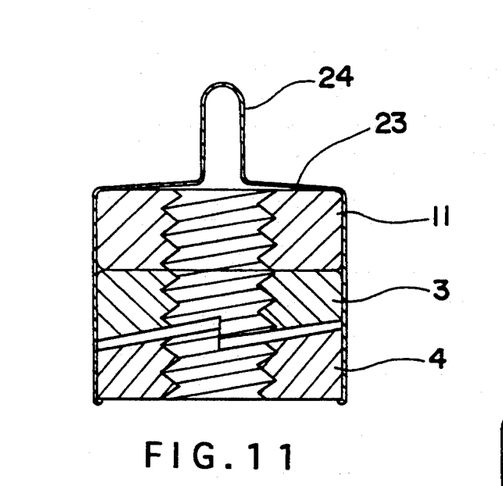
FIG. 11 is a longitudinal sectional view of a casing for holding the lock nut of the present invention.
Figure 12:
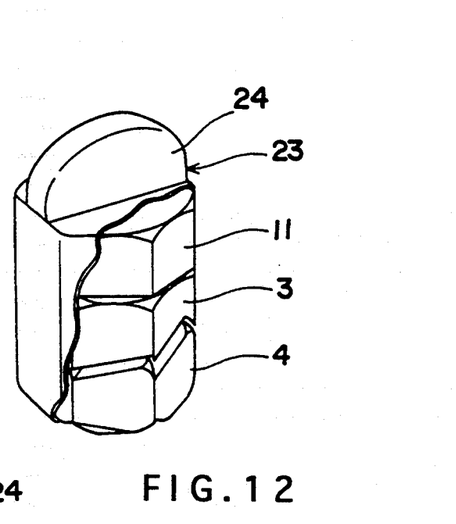
FIG. 12 is a partially perspective view of the casing.
Figure 13:
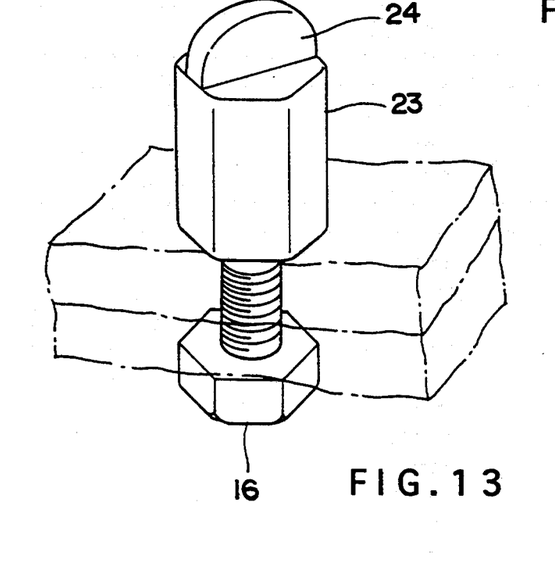
FIG. 13 is an explanatory diagram showing the first procedure for screwing the lock nut onto the bolt by means of the casing.

Referring next to FIGS. 11 and 12, there is shown a casing for screwing the lock nut of the present invention onto the bolt without error and easily and promptly. This casing is made of a transparent rigid resin film or rubber material having a resilience. The pressure nut 11 and the first nut 3 and the second nut 4 are resiliently and removably held within the interior thereof. Then, under the state where the first nut 3 and the second nut 4 are locked with each other, the three nuts are integrally screwed on the shank of the bolt 16 as shown in FIG. 13.

Figure 14:
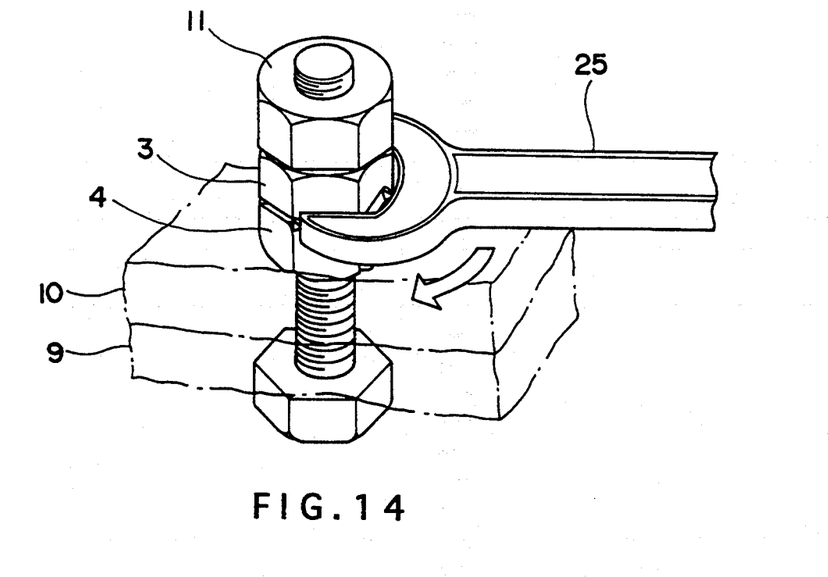
FIG. 14 is an explanatory diagram showing the second procedure for screwing the lock nut onto the bolt by means of the casing.

Afterwards, a grip 24 is pulled outwardly in the axial direction to remove the casing 23. Then the first nut 3 and the second nut 4 are simultaneously and integrally rotated by the spanner 25 as shown in FIG. 14 to thereby fasten the plate material to be fastened 10 onto the fastening plate material 9.

Figure 15:
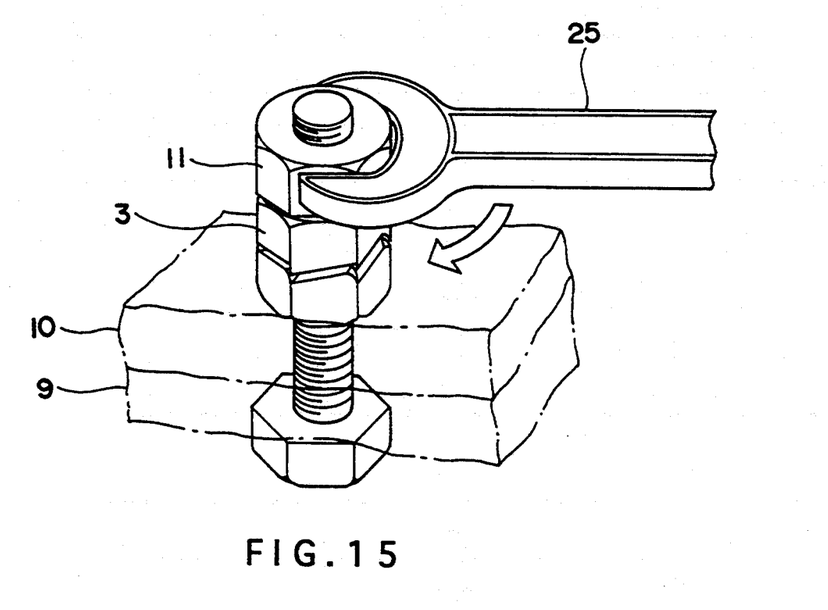
FIG. 15 is an explanatory diagram showing the third procedure for screwing the lock nut onto the bolt by means of the casing.

Subsequently, the spanner 25 is fitted onto only the pressure nut 11 for rotation. Then the pressure nut 11 is fixedly fastened to the first nut 3.

This pressure nut 11 is a standard nut widely available in the market.

Figure 6:
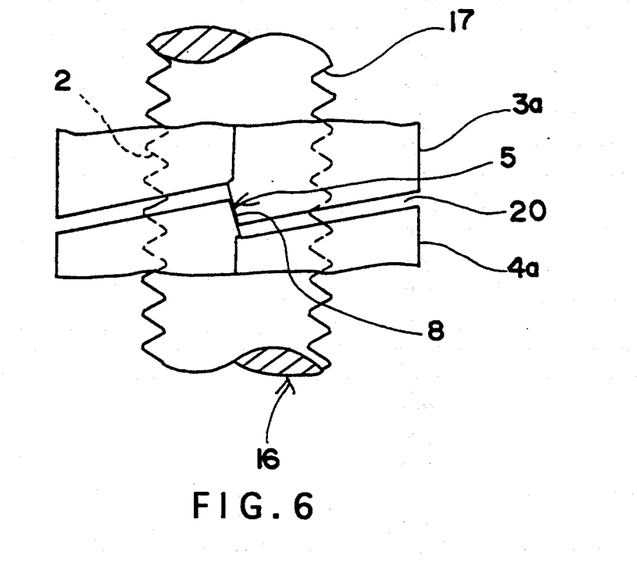
FIG. 6 is an explanatory diagram showing the locking state of a second embodiment of the lock nut and corresponding to the embodiment in FIG. 4.

FIG. 6 depicts another embodiment of the locking portion 5 which differs from the embodiment in FIG. 4 in that the rise-up surface 8 is slightly inclined. Irrespective of the state where the rise-up surface is slightly inclined, an axial pressing force is not substantially applied to between the end surfaces of the pair of first nut 3a and the second nut 4a. It is relatively easy by virtue of a press machine or the like to form the serrated end surfaces having such rise-up surface 8 on the first nut 3a and the second nut 4a, respectively. Thus, by inclining the rise-up surface 8, there can be provided a lock nut having a good mass-productivity.

Although the pitches of the male thread 17 of the bolt 16 and the helical grooves 2 of the first nut 3a and the second nut 4a are designed to be relatively large and their backlashes are also relatively large for the convenience of illustration, the pitches and backlashes of a variety of widely available bolts and nuts can be used as they are, thereby presenting the same technical function and effect of the present invention.

Figure 7:
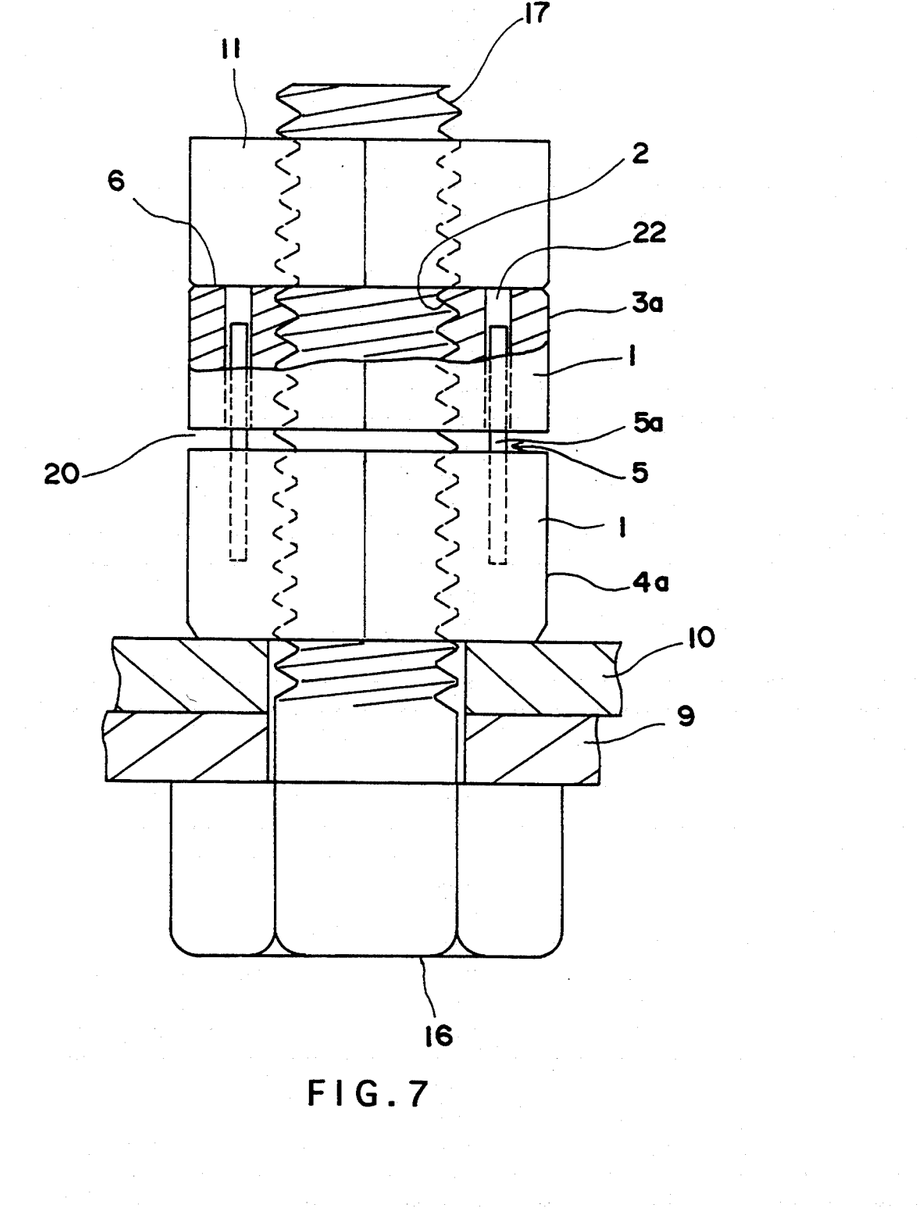
FIG. 7 is a partially cut-away view showing the state where a further embodiment of the present invention is in use.

FIG. 7 depicts a further embodiment of the present invention differing from the first embodiment having the locking portions 5 with serrated step-like surfaces in that a connection pin 5a and a through-hole 22 are provided as a locking means for the first nut 3a and the second nut 4a. More specifically, the polygonal planes 1 of the first nut 3a and the second nut 4a are aligned with one another and the connection pin 4a is inserted into between the two nuts in the axial direction, while the male thread 17 of the bolt 16 is screwed thereon with the gap 20 formed between the end surfaces in the axial direction of the two nuts.

The following procedure can be done, by way of example, to establish a relation among the locking portion 5 and the polygonal planes 1 and the helical grooves 2 by the connection pin 5a between the first nut 3a and the second nut 4a.

First, the first nut 3a and the second nut 4a are screwed onto the male thread 17 of the bolt 16 so as to interpose a gap 20 between the two nuts. Simultaneously with it, the individual polygonal planes 1 are aligned with one another. Then, the first nut 3a and the second nut 4a are integrally fixed together, and the through-hole 22 is provided from the top surface of the first nut 3a in such a manner that it can reach the intermediate portion of the second nut 4a. In this embodiment, the through-hole 22 of the first nut 3a is formed to be much larger than that of the second nut 4a. Then, the connection pin 5a is press fitted into the hole of the second nut 4a in such a manner that it protrudes from one end surface of the second nut 4a. Although a pair of connection pins 5a protrudes from one end surface of the second nut 4a in this embodiment, the number thereof can be set optionally.

In the lock nut of the present invention the two nuts are locked by the locking portions 5 provided on the confronting planes of the nuts so that the two nuts can be integrally rotated. Accordingly, when the two nuts rotate in the loosening direction of the nut, they are not loosened unless they are integrally rotated in that direction. In addition, the end surface of the pressure nut 11 for pressing is brought into press-contact with the end surface of the first nut in the axial direction, thereby-ensuring a strong locking state between the pressure nut 11 and the first nut 3. As a result, the first nut is prevented from loosening, and hence the second nut locked by the first nut is restricted to present a lock nut free from loosening as a whole.

The reason why the strong locking state is produced between the first nut and the pressure nut is as follows. When the first nut 3 and the second nut 4 are being locked, the two nuts does not substantially come into surface-contact with each other in the axial direction so that a separation state in the axial direction is presented between the first nut 3 and the second nut 4. Since the first nut is not subjected to the pressing force in the axial direction by the second nut 4, the first nut 3 is displaceable in the axial direction by the pressing force. The shank 13 of the bolt 16 is drawn by the first nut 3 and the pressure nut 11 in the opposite directions so that the female thread surfaces of the two nuts 3, 11 are together brought into press-contact with the male thread surface of the bolt. Due to this, the frictional resistance of the thread surface is extremely increased so as to form an ideal locking state.

In other words, the locking state of the double nut as shown in FIG. 9 is established instead of double nut structure having no locking ability as shown in FIG. 10. In the double nut locking state shown in FIG. 9, the two nuts are fastened together at a position on the bolt 16 where they have no relation with the member to be fastened. Accordingly, the upper surface side of the female thread of the nut 18 becomes a contact surface 14 and the lower surface side becomes a non-contact surface 15 in the view, while the lower surface side of the nut 19 becomes the contact-surface 14 and the upper surface side becomes the non-contact surface 15, so that the opposite surfaces of the two nuts can be brought into press-contact with the male thread. Then, the shank of the bolt 16 is drawn by the pair of nuts 18, 19 around the line A vertically in the opposite directions, so that a large stress is exerted on the boundary between the two nuts in the opposite directions. Then, the female threads of the two nuts are strongly brought into press-contact with the male thread 17. Thus, the length of the contact surface being in contact with the male thread 17 is doubled to double the frictional resistance between the nut and bolt.

Conversely, the present invention prevents the conventional double nut structure shown in FIG. 10 to be formed. That is, if the nut 18 is fastened to the nut 19 as in the conventional structure shown in FIG. 10, the bolt is upward pulled by the nut 18 so that the male thread and female thread of the nut 19 are not brought into contact with each other. As a result of this, the nut 19 easily rotates to cancel the anti-loosening effect.

Thus, in the lock nut of the present invention, as shown in FIG. 2, a gap is constantly interposed between the first nut 3 and the second nut 4 to prevent the female thread of the second nut 4 from being separated from the male thread 17. Then, the first nut 3 and the pressure nut 11 form in cooperation an ideal locking state shown in FIG. 9. Futhermore, an rotation-stop is effected between the first nut 3 and the second nut 4 by means of the locking portion 5.

As a result, a lock nut which is strong as a whole can be obtained.

What is claimed is:

1. A lock nut comprising a first nut and a second nut each having at its outer periphery in the radial direction polygonal planes, each having the same helical groove on the inner surface of a hole provided therein, and each having first and second end surfaces, said pair of nuts being superposed in the axial direction, said first end surface of said first and second nuts being planar, said first and second nuts including locking means provided on said second end surface for preventing the rotation of said first and second nuts relative to each other, thereby preventing the loosening of said lock nut, said first and second nuts intended to be integrally and rotationally screwed on the outer periphery of the shank of a bolt by engaging with each other, the pair of first and second nuts when engaged satisfying the following conditions:

(1) said polygonal planes of said first nut and said second nut are aligned in the axial direction;

(2) the leading end of said helical groove of said second nut is located on an elongated line of said helical groove at the trailing end of said helical groove of said first nut; and (3) said locking means are to be so formed that a pressing force in the axial direction is not transmitted between said second end surfaces of said first and second nuts in the axial direction.

2. A lock nut according to claim 1, further comprising a pressure nut for bringing a first end surface of said pressure nut into press-contact with said planar surface of said first nut, and for bringing said planar surface of said second nut into press-contact with the surface of the member to be fastened.

3. A lock nut according to claim 1 wherein said locking means comprises at least one serration located on said second end surface of said first nut at least one serration located on said second end surface of said second nut.

4. A lock nut according to claim 3 wherein said helical grooves of said first and second nuts are formed such that when said serrations of said first and said second nuts are brought into contact, a gap is formed between said second end surfaces of said first nut and said second nut in the axial direction.

5. A lock nut including a first nut and a second nut each having at its outer periphery in the radial direction polygonal planes, each having the same helical groove on the inner surface of a hole provided therein, and each having a first and second end surface, said pair of nuts being superposed in the axial direction, said first end surface of said first nut defining a plane with which a pressure nut for pressing comes into press-contact, said first end surface or said second nut defining a plane which is press-contacted by the surface of a member to be fastened;

said second end surface of said first nut and said second nut having axial sections with at least one serration, said at least one serration constituting locking means for preventing the circumferential rotation of said first and second nuts, when said first and second nuts are engaged with each other by said locking means and are screwed onto the outer periphery of the shank of a bolt, the following conditions being satisfied:

(1) said polygonal planes of said first nut and said second nut are aligned in the axial direction;

(2) the leading end of said helical groove of said second nut is located on an elongated line of said helical groove at the trailing end of said helical groove of said first nut; and (3) said locking means are to be so formed that a pressing force in the axial direction is not substantially transmitted between said second end surfaces of said first and second nuts in the axial direction.

6. A lock nut according to claim 5 wherein said helical grooves of said first and second nuts are formed such that when said serrations of said first and said second nuts are brought into contact, a gap is formed between said second end surfaces of said first nut and said second nut in the axial direction.

7. A lock nut according to claim 5, further comprising a pressure nut for bringing a first end surface of said pressure nut into press-contact with said first end surface of said first nut, and for bringing said first end surface of said second nut into press-contact with the surface of the member to be fastened.

8. A lock nut including a first nut and a second nut each having at its outer periphery in the radial direction polygonal planes, each having the same helical groove on the inner surfaces of a hole provided therein, and each having a first and second end surface, said pair of nuts being superposed in the axial direction, said first end surface of said first nut defining a plane with which a pressure nut for pressing comes into press-contact;

said first surface of said second nut defining a plane which is press-contacted by the surface of a member to be fastened;

said second end surface said first nut and said second nut having axial sections with at least one serration, said at least one serration constituting locking means for preventing the circumferential rotation of said first and second nuts, said lock nut further comprising:
- a connection pin for coupling said first and second nuts so as to form a locking means for preventing the circumferential rotation of the first and second nuts,
- when said first and second nuts are engaged with each other by said locking means and are screwed onto the other periphery of the shank of a bolt, the following conditions being satisfied:
- (1) said polygonal planes of said first nut and said second nut are aligned in the axial direction;
- (2) the leading end of said helical groove of said second nut is located on an elongated line of said helical groove at the trailing end of said helical groove of said first nut; and
- (3) said locking means and said connection pin are to be so formed that a pressing force in the axial direction is not substantially transmitted between said second end surfaces of said first and second nuts in the axial direction.

9. A lock nut according to claim 8 wherein said helical grooves of said first and second nuts are formed such that when said serrations of said first and said second nuts are brought into contact, a gap is formed between said second end surfaces of said first nut and said second nut in the axial direction.

10. A lock nut according to claim 8, further comprising a pressure nut for bringing a first end surface of said pressure nut into press-contact with said first end surface of said first nut, and for bringing said first end surface of said second nut into press-contact with the surface of the member to be fastened.

11. A lock nut comprising a first nut and a second nut each having at its outer periphery in the radial direction polygonal planes, each having the same helical groove on the inner surface of a hole provided therein, and each having first and second end surfaces, said pair of nuts being superposed in the axial direction,
- said first end surface of said first and second nuts being planar,
- said first and second nuts including locking means provided on said second end surface for preventing the rotation of said first and second nuts relative to each other, thereby preventing the loosening of said lock nut,
- said first and second nuts intended to be integrally and rotationally screwed on the outer periphery of the shank of a bolt by engaging with each other,
- a pressure nut for bringing a first end surface of said pressure nut into press-contact with said planar surface of said first nut, and for bringing said planar surface of said second nut into press-contact with the surface of the member to be fastened,
- the pair of first and second nuts when engaged satisfying the following conditions:
- (1) said polygonal planes of said first nut and said second nut are aligned in the axial direction;
- (2) the leading end of said helical groove of said second nut is located on an elongated line of said helical groove at the trailing end of said helical groove of said first nut; and
- (3) said locking means are to be so formed that a pressing force in the axial direction is not transmitted between said second end surfaces of said first and second nuts in the axial direction.

* * * * *